United States Patent
Choi (10) Patent No.: US 10,797,448 B2
(45) Date of Patent: Oct. 6, 2020

(54) CONNECTING SYSTEM FOR CHARGING ELECTRIC VEHICLE

(71) Applicants: Hyundai Motor Company, Seoul (KR); KIA Motors Corporation, Seoul (KR)

(72) Inventor: Byung-Yoon Choi, Gyeonggi-do (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/416,741

(22) Filed: May 20, 2019

(65) Prior Publication Data

US 2020/0127424 A1 Apr. 23, 2020

(30) Foreign Application Priority Data

Oct. 23, 2018 (KR) .......................... 10-2018-0126988

(51) Int. Cl.
*H01R 13/707* (2006.01)
*H01R 13/717* (2006.01)

(52) U.S. Cl.
CPC ....... *H01R 13/707* (2013.01); *H01R 13/7175* (2013.01); *H01R 2201/26* (2013.01)

(58) Field of Classification Search
CPC .............. H01R 13/707; H01R 13/7175; H01R 2201/26
See application file for complete search history.

(56) References Cited

U.S. PATENT DOCUMENTS

| | | | | |
|---|---|---|---|---|
| 5,344,330 A * | 9/1994 | Hoffman | ................. | B60L 50/66 439/138 |
| 5,344,331 A * | 9/1994 | Hoffman | .............. | H01R 13/453 439/138 |
| 5,443,389 A * | 8/1995 | Hughes | .................... | B60D 1/62 439/35 |
| 5,637,977 A * | 6/1997 | Saito | .................... | H01R 13/629 320/109 |
| 5,751,135 A * | 5/1998 | Fukushima | ............. | B60L 53/65 320/107 |
| 2008/0113522 A1* | 5/2008 | Wagner | .............. | H01R 13/5213 439/35 |
| 2012/0171900 A1* | 7/2012 | Sebald | .................... | B60L 53/16 439/626 |
| 2012/0212179 A1* | 8/2012 | Nathan | ..................... | B60L 3/00 320/109 |

(Continued)

FOREIGN PATENT DOCUMENTS

KR 1020160052286 A 5/2016

*Primary Examiner* — Truc T Nguyen
(74) *Attorney, Agent, or Firm* — Brinks Gilson & Lione (57) ABSTRACT

A connecting system for charging an electric vehicle may include a connector comprising a male connector connected to a battery side for supplying electric energy to a vehicle and a female connector connected to the male connector; an interlock circuit for constituting a closed circuit by connecting an interlock terminal of the male connector and an interlock terminal of the female connector to each other; a control unit having a built-in battery, and for measuring the voltages at both ends of the interlock circuit; a light-emitting load provided on the interlock circuit inside the male connector; and a ground switch provided on the interlock circuit inside the male connector.

4 Claims, 9 Drawing Sheets

(56) References Cited

U.S. PATENT DOCUMENTS

| | | | | |
|---|---|---|---|---|
| 2012/0315801 A1* | 12/2012 | Kwasny | ............... | H01R 43/20 |
| | | | | 439/695 |
| 2013/0015929 A1* | 1/2013 | Bryan | ............... | B60Q 11/005 |
| | | | | 335/7 |
| 2013/0029193 A1* | 1/2013 | Dyer | ............... | B60L 53/14 |
| | | | | 429/62 |
| 2013/0066514 A1* | 3/2013 | Das | ............... | H05K 5/0069 |
| | | | | 701/31.5 |
| 2013/0271075 A1* | 10/2013 | Restrepo | ............... | B60L 53/65 |
| | | | | 320/109 |
| 2014/0094046 A1* | 4/2014 | Lamb | ............... | H01R 13/62 |
| | | | | 439/152 |
| 2014/0335711 A1* | 11/2014 | Lamb | ............... | B60D 1/64 |
| | | | | 439/258 |
| 2015/0263549 A1* | 9/2015 | Lee | ............... | B60L 53/65 |
| | | | | 361/93.4 |
| 2016/0075244 A1* | 3/2016 | Im | ............... | B60L 11/1818 |
| | | | | 320/107 |
| 2017/0106760 A1* | 4/2017 | Wang | ............... | B60L 53/53 |
| 2017/0166070 A1* | 6/2017 | Dunger | ............... | B60L 58/21 |
| 2018/0086223 A1* | 3/2018 | Lindemann | ............... | G06Q 10/0631 |
| 2018/0334052 A1* | 11/2018 | Hwang | ............... | H01R 13/703 |
| 2019/0031038 A1* | 1/2019 | Pursifull | ............... | B60L 53/31 |
| 2019/0039464 A1* | 2/2019 | Greifelt | ............... | B60L 53/12 |
| 2019/0111899 A1* | 4/2019 | Lange, III | ............... | B60Q 1/46 |
| 2019/0291588 A1* | 9/2019 | Chou | ............... | B60L 53/18 |

\* cited by examiner

FIG.1

Prior Art

CONNECTING SYSTEM FOR CHARGING ELECTRIC VEHICLE

CROSS-REFERENCE TO RELATED APPLICATION

This application claims priority to and the benefit of Korean Patent Application No. 10-2018-0126988, filed on Oct. 23, 2018, which is incorporated herein by reference in its entirety.

FIELD

The present disclosure relates to an electric vehicle using electricity as a power source, and more particularly, to a connecting system for charging an electric vehicle.

BACKGROUND

The statements in this section merely provide background information related to the present disclosure and may not constitute prior art.

An electric vehicle is a vehicle that mounts a high-voltage battery therein to use electric energy from the high-voltage battery as a power source for driving a motor.

Then, the electric vehicle mounts a connecting system for connecting the battery to an external power supply means in order to charge the battery.

Figure 1:
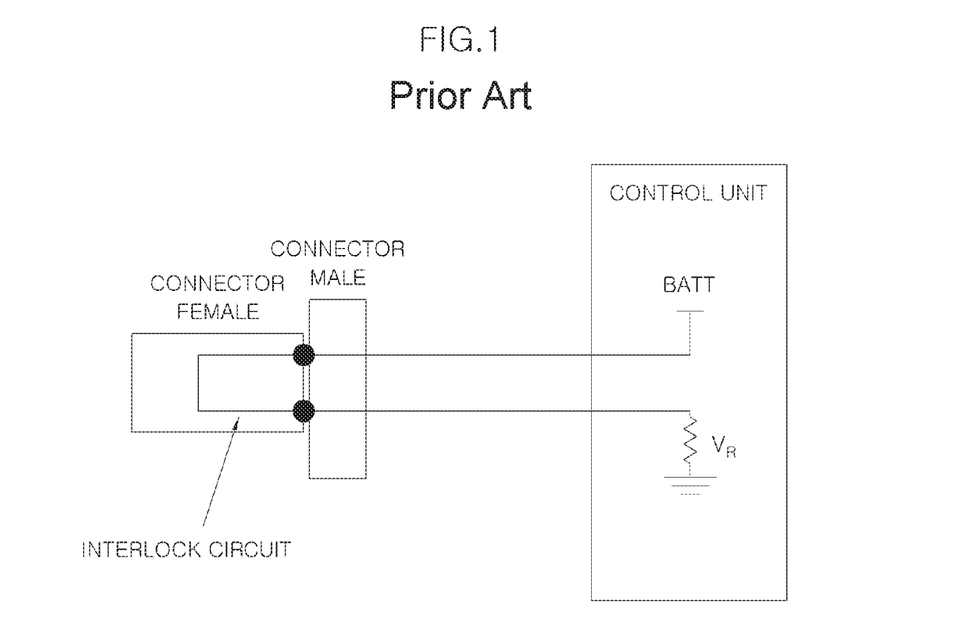
FIGS. 1 to 6 are diagrams schematically illustrating a conventional connecting system.
Figure 2:
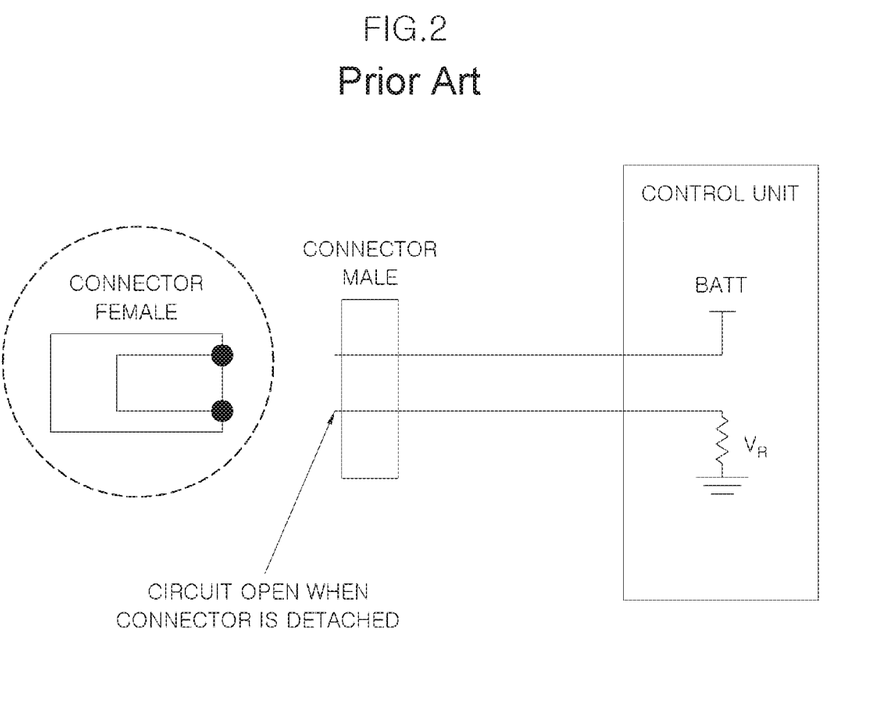

FIGS. 1 and 2 schematically illustrate a conventional connecting system, and FIG. 1 illustrates a state where connectors are normally connected, and FIG. 2 illustrates an abnormal state where a connector is not connected thereto.

As may be seen, the connecting system includes a male connector at a control unit side having a built-in battery and a female connector electrically connected thereto, such that the male connector and the female connector are connected in the normal state, thereby supplying electric energy from the battery to the vehicle.

Then, an interlock terminal is provided between the male connector and the female connector, respectively, and an interlock circuit through the interlock terminal between the male connector and the female connector is built in a connector including the male connector and the female connector as a loop circuit, such that when unintentional detachment occurs between the male connector and the female connector, it is configured to be detected by the interlock circuit.

In the normal state of FIG. 1, since the interlock circuit is closed, the $V_R$ (Voltage Reference)≥$V_{SET}$ (Voltage Setting Value) state is established.

However, in the detached state of FIG. 2, the interlock circuit is opened to become the $V_R$ (Voltage Reference) ≤$V_{SET}$ (Voltage Setting Value) state, and it is diagnosed that the connector has been detached by detecting it.

Figure 3:
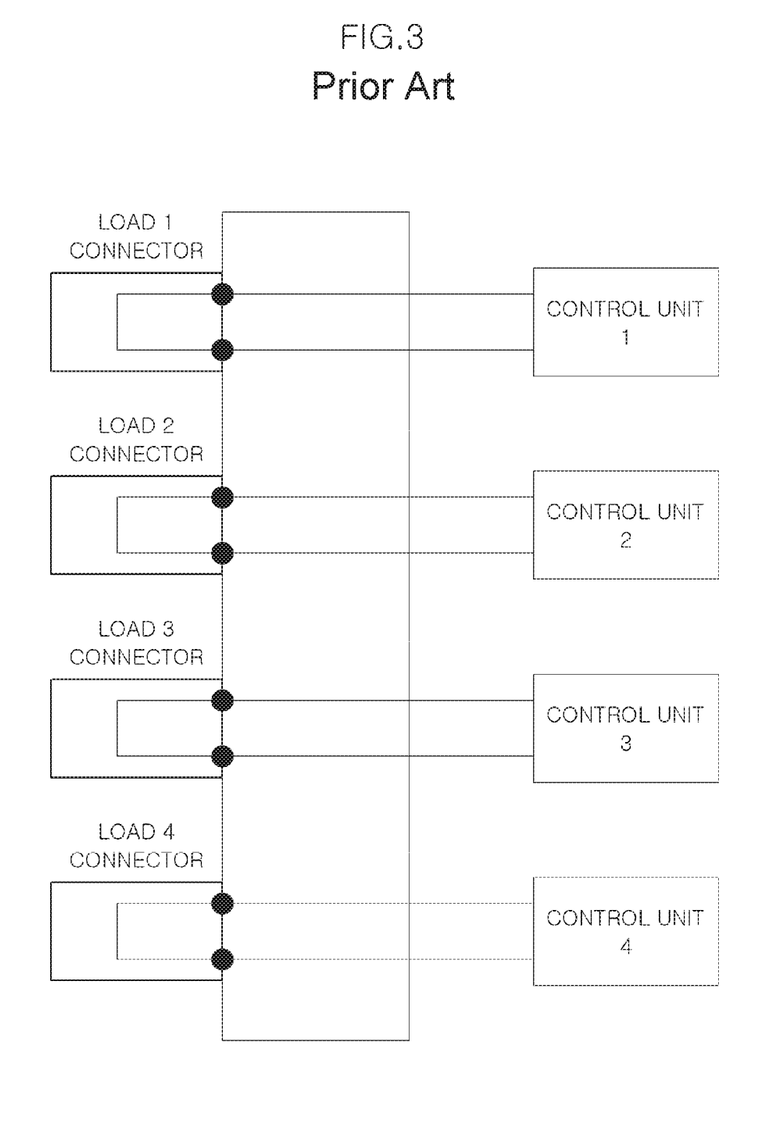
Figure 4:
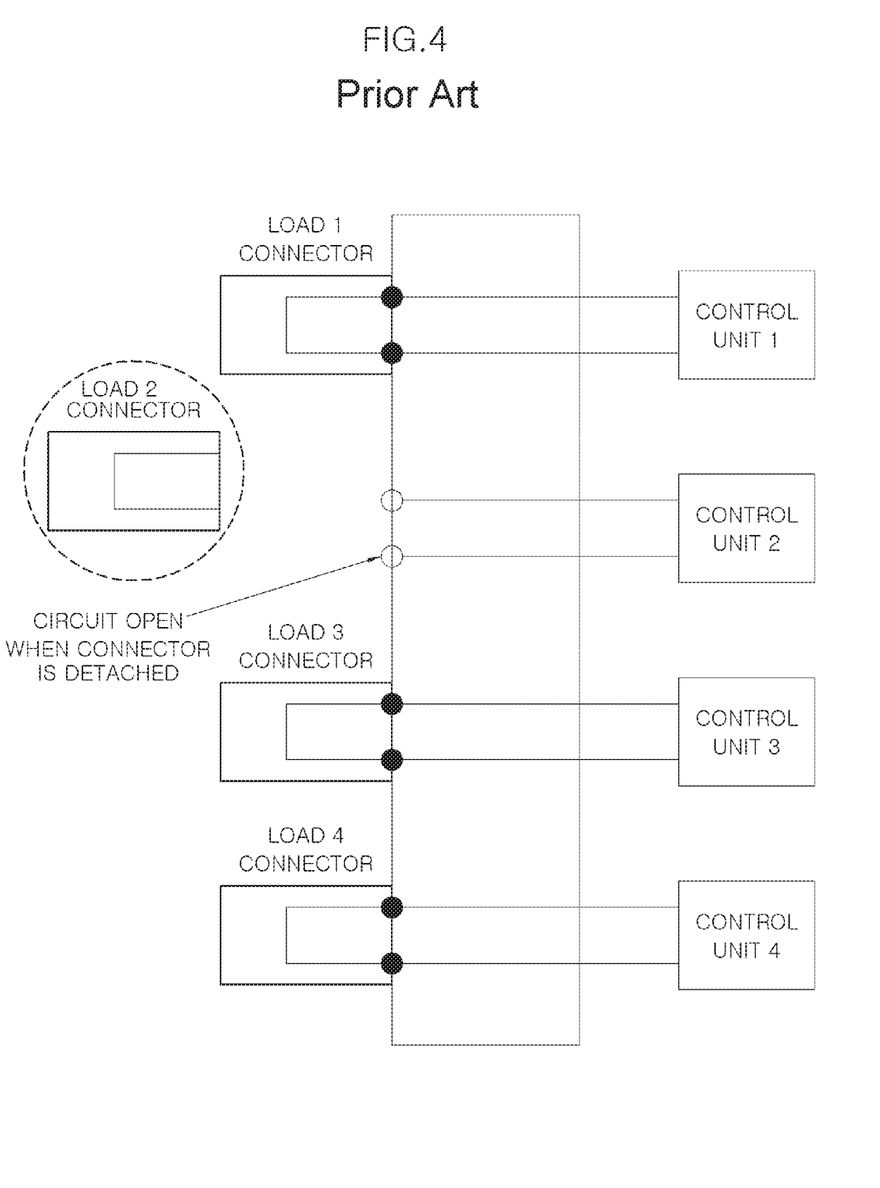

Meanwhile, FIGS. 1 and 2 illustrate an example in which a single control unit detects a single connector, and when a plurality of connectors are provided, the control units as many as the number of load connectors are provided as illustrated in FIGS. 3 and 4, such that as illustrated in FIG. 3, it is determined as a normal state in the state where the interlock closed circuit of each load has been closed, and as illustrated in FIG. 4, when a specific load connector is detached, the corresponding interlock circuit is opened and the corresponding control unit detects it, thereby confirming whether any connector is abnormal.

However, in this case, the control units as many as the number of load connectors are present.

Figure 5:
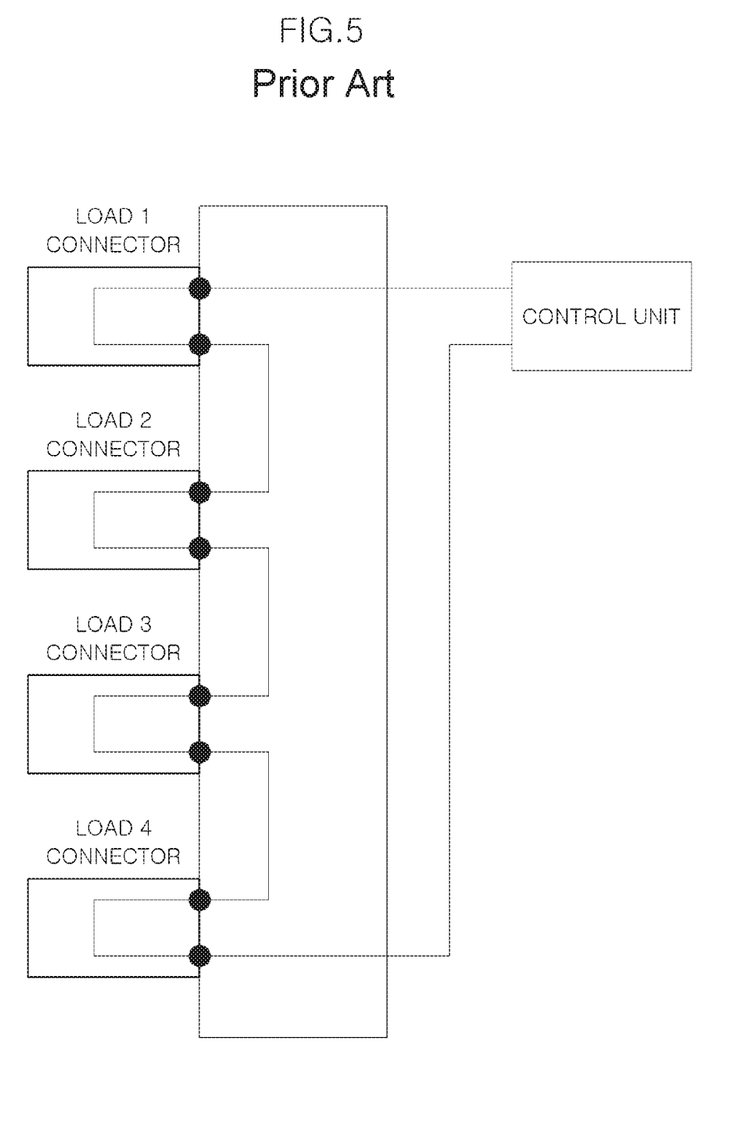
Figure 6:
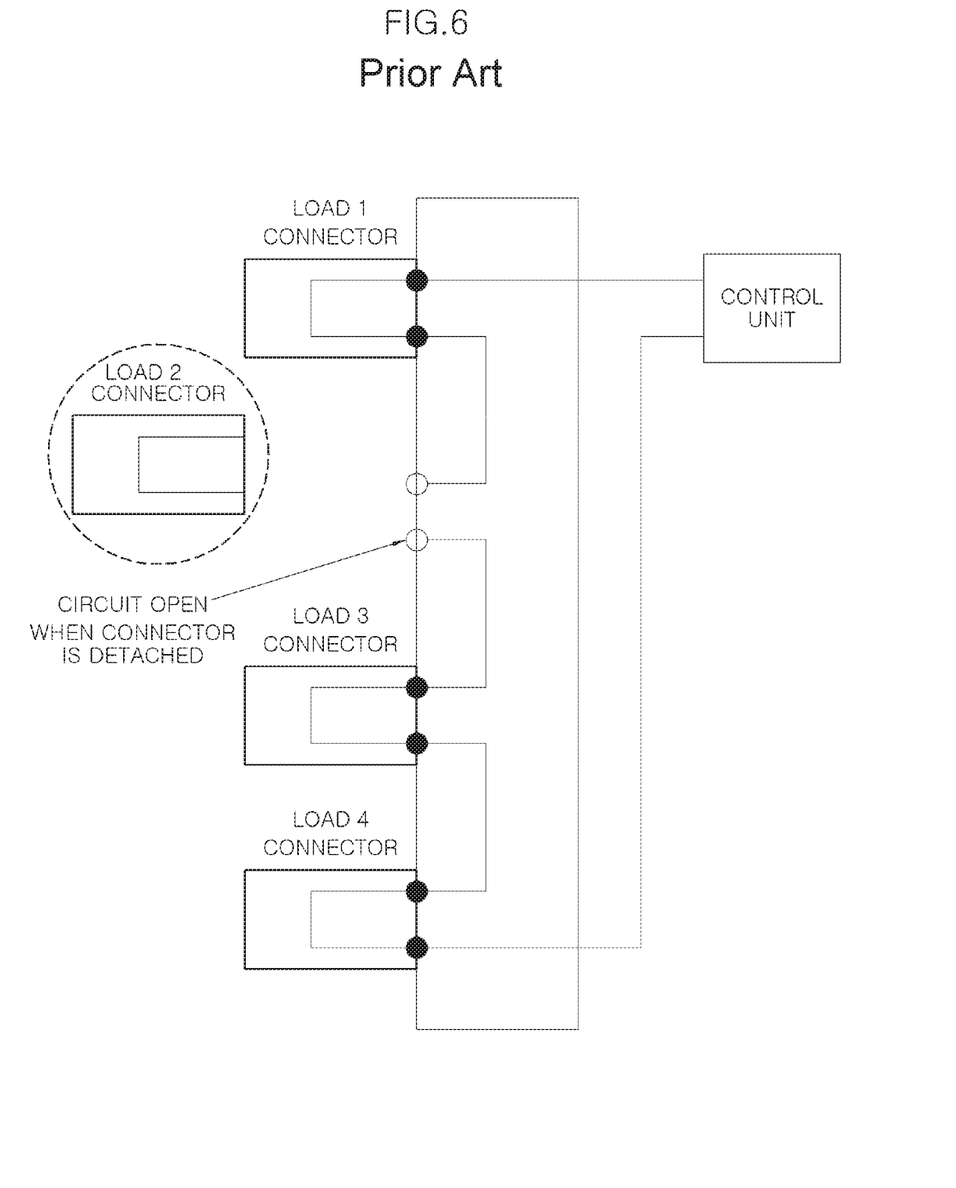

However, when only single control unit is configured for a plurality of connectors as illustrated in FIGS. 5 and 6, an interlock closed circuit is configured in the normal state of FIG. 5, but as illustrated in FIG. 6, when only one of the plurality of connectors is detached, it is detected that the interlock circuit is opened but it is not possible to accurately detect which connector has been abnormal.

The contents described in this section are to help the understanding of the background of the present disclosure, and may not necessarily constitute prior art.

SUMMARY

The present disclosure provides a connecting system for charging an electric vehicle, which may easily detect which connector among a plurality of connectors is abnormal by a single control unit.

A connecting system for charging an electric vehicle according one aspect of the present disclosure includes a connector including a male connector connected to a battery side for supplying electric energy to a vehicle and a female connector connected to the male connector, an interlock circuit for constituting a closed circuit by connecting an interlock terminal of the male connector and an interlock terminal of the female connector to each other, a control unit having a built-in battery, and for measuring the voltages at both ends of the interlock circuit, a light-emitting load provided on the interlock circuit inside the male connector, and a ground switch provided on the interlock circuit inside the male connector.

Then, the ground switch is configured in parallel with the light-emitting load.

In addition, the connector is configured in plural, in other words with a plurality of connectors, and the interlock circuit has a plurality of interlock terminals of the plurality of connectors connected to each other to constitute a closed circuit.

Herein, the control unit connected to the interlock circuit is a single configuration.

In addition, the light-emitting load and the ground switch are configured inside the male connector of each of the plurality of connectors.

According to the connecting system for charging the electric vehicle of the present disclosure, it is possible for a single control unit to easily detect an abnormal connector among the plurality of connectors by the light-emitting load and the ground switch provided on the plurality of connectors, thereby configuring the system at low cost.

Therefore, it is possible to improve maintainability such as shortening the maintenance time of an environmental-friendly vehicle including an electric vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to fully understand the present disclosure, reference should be made to the accompanying drawings exemplifying aspects of the present disclosure and the contents illustrated in the accompanying drawings.

In describing the present disclosure, a description of known technology or repeated descriptions that may unnecessarily obscure the subject matter of the present disclosure will be reduced or omitted.

Figure 7:
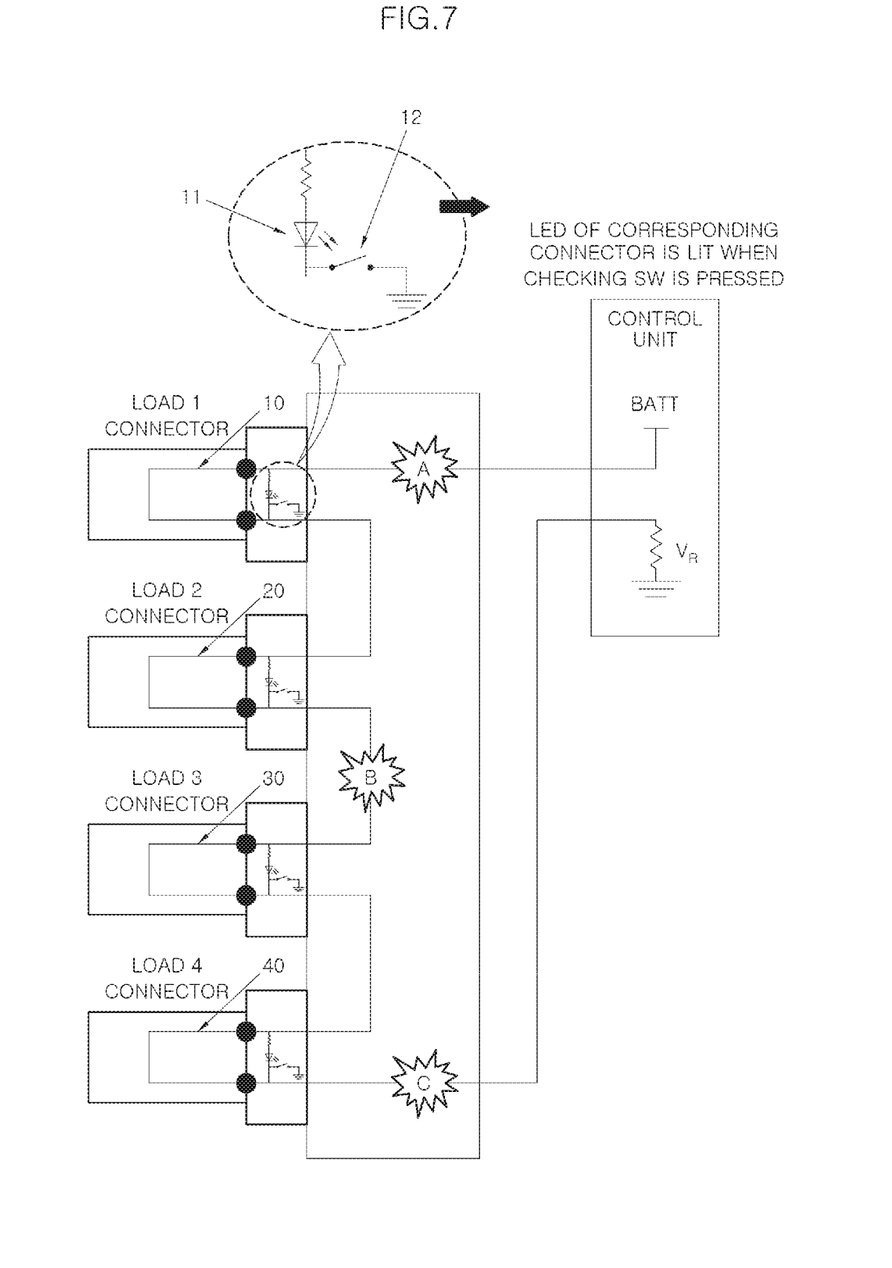
FIG. 7 is a diagram illustrating a connecting system according to the present disclosure.
Figure 8:
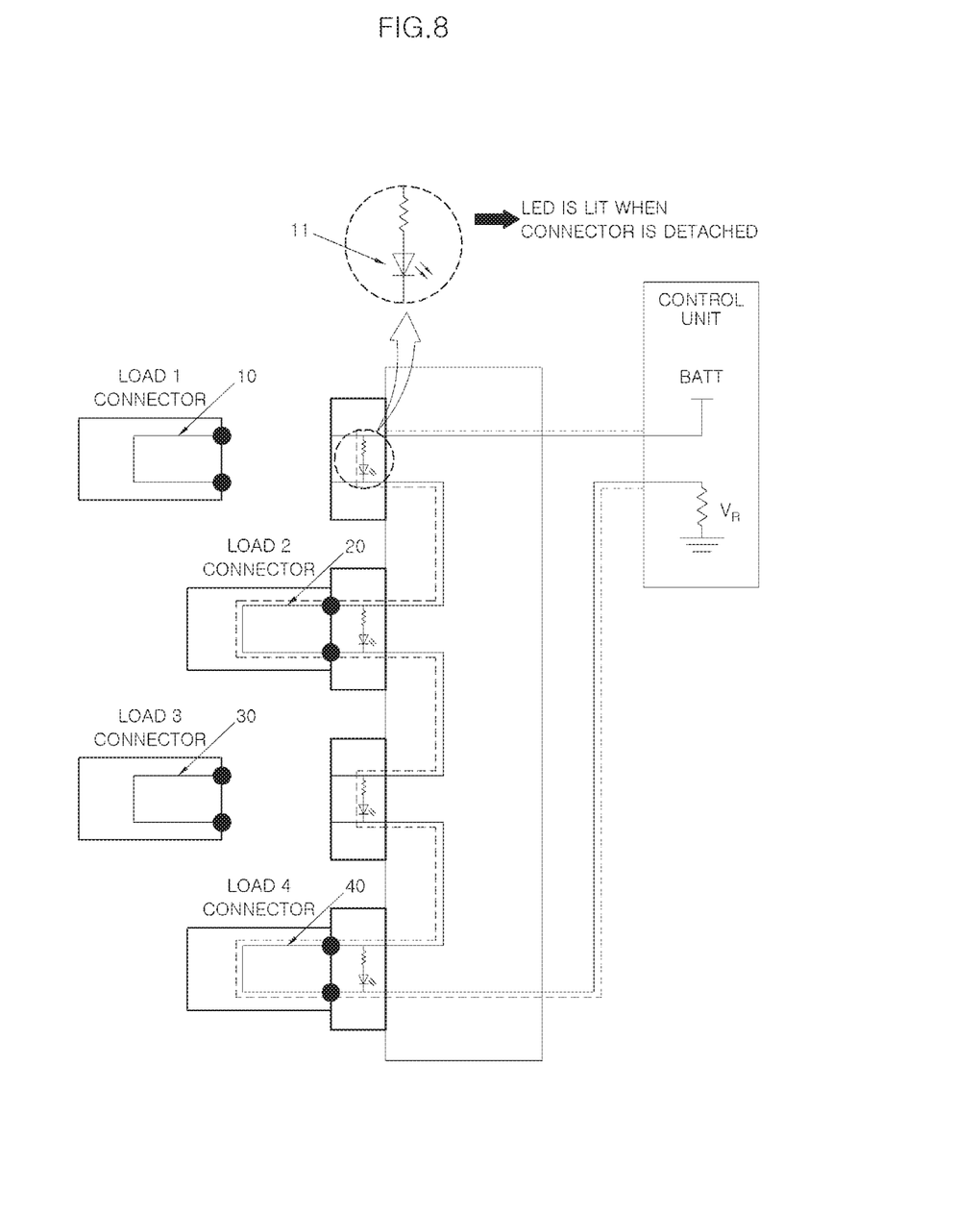
FIG. 8 is a diagram illustrating the operating state of the connecting system of FIG. 7.

FIG. 7 is a diagram illustrating a connecting system according to the present disclosure, and FIG. 8 is a diagram illustrating an operating state of the connecting system of FIG. 7.

Hereinafter, the connecting system for charging an electric vehicle according to one aspect of the present disclosure will be described with reference to FIGS. 7 and 8.

The connecting system according to the present disclosure is a configuration that is built in an electric vehicle and connects to use a high voltage battery as a power source of a vehicle, and is a system including a single control unit and a plurality of connectors, and for accurately recognizing the detached connector among the plurality of connectors by a control unit.

The control unit has a built-in high-voltage battery, and a male connector of each of the plurality of connectors is connected to a battery side, and a female connector is electrically connected in pairs with each male connector.

Then, the interlock terminal is provided between the male connector and the female connector, respectively, and the interlock circuits 10, 20, 30, 40 connected to each other between interlock terminals between the male connector and the female connector are built-in in the connector including the male connector and the female connector as a loop circuit to configure an interlock circuit, and when the interlock circuit is opened by the detachment between the male connector and the female connector, the control unit for measuring the voltages at both ends of the interlock circuit recognizes it.

Herein, a light-emitting load 11 is added to the interlock circuit of each male connector.

That is, when a pair of terminals of the male connector are closed, no current flows in the light-emitting load 11, and when the female connector is detached and a pair of terminals of the male connector are opened, a current flows in the light-emitting load 11 to turn on the light of the light-emitting load 11 such as an LED, thereby easily confirming visually it.

Therefore, it is possible to easily confirm which connector has been detached by only a single control unit.

However, it is not possible to confirm at which position the failure (circuit disconnection) has occurred by only light-emitting element when the closed loop is not configured by the circuit disconnection rather than the unconnected connector. That is, when the circuit itself is disconnected, the light-emitting element is not turned on even if there is an unconnected connector, thereby not confirming whether the connector is detached.

For this purpose, the present disclosure further includes a ground switch in parallel with each light-emitting load configured in each male connector.

Therefore, when a ground switch 12 is pressed (ON) as illustrated, the light-emitting load 11 configured in the corresponding connector is turned on.

Therefore, it is possible to confirm whether the front end of the corresponding connector is disconnected.

Figure 9:
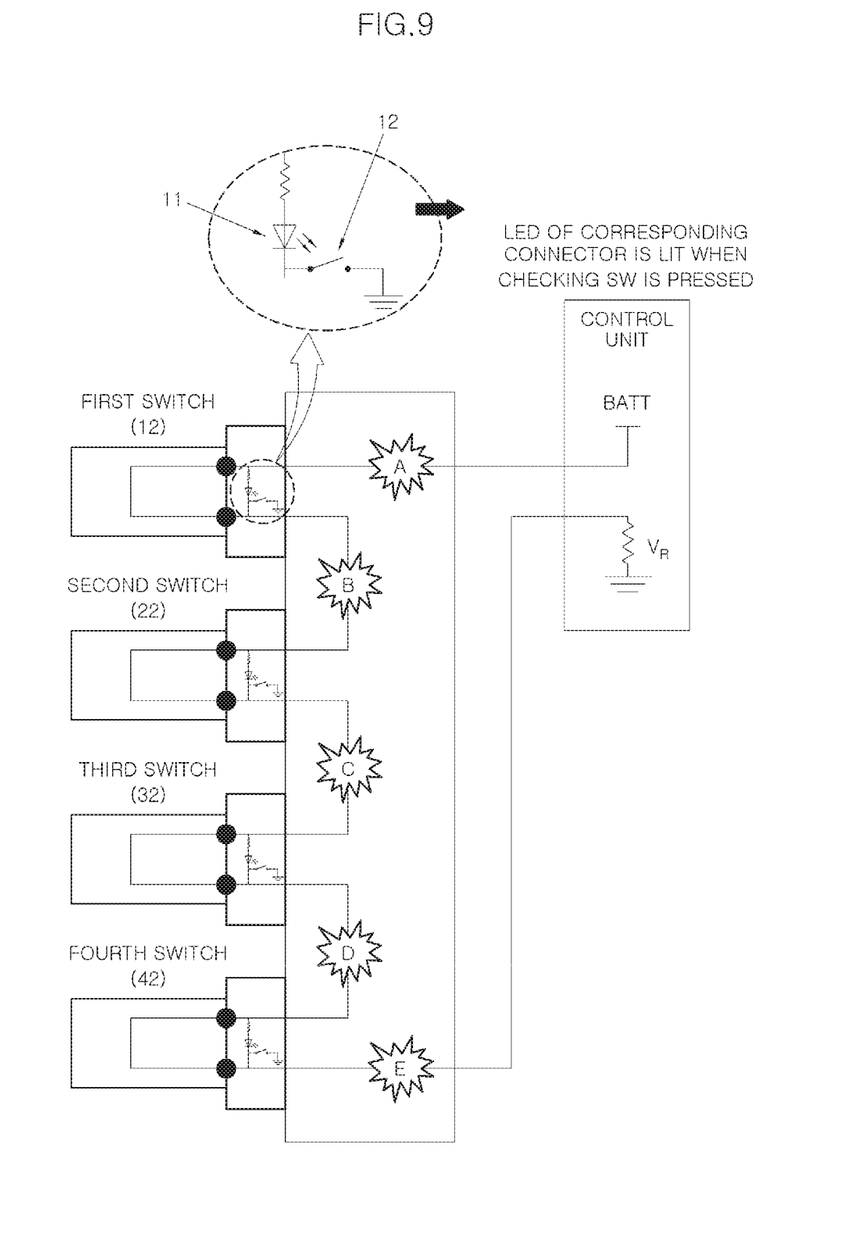
FIG. 9 is a diagram for explaining a disconnection diagnosis method by the connecting system of the present disclosure.

That is, if all of the light-emitting loads do not turn on when a first switch 12, a second switch 22, a third switch 32, and a fourth switch 42, which are ground switches, are pressed as illustrating in FIG. 9, it may be determined that a disconnection has occurred at the point A that is the front end of the connector of the load 1.

Then, if the corresponding light-emitting load is turned on when the first switch 12 and the second switch 22 are pressed and the corresponding light-emitting load is not turned on when the third switch 32 and the fourth switch 42 are pressed, it may be determined that a disconnection has occurred at the point B that is the rear end of the connector of the load 2 and the front end of the connector of the load 3.

In addition, if all of the light-emitting loads are turned on when all of the first switch 12, the second switch 22, the third switch 32, and the fourth switch 42 are pressed, it may be determined that a disconnection has occurred at the point C that is the rear end of the connector of the load 4.

In the method of diagnosing the failure by the connecting system of the present disclosure configured as described above, when an interlock fault code is first generated in the vehicle, whether the light-emitting load configured in the plurality of load connectors emits light is confirmed.

When the connector has been detached without disconnection, the corresponding connector may be confirmed.

That is, as illustrated in FIG. 8, when the connectors of the load 1 and the load 3 are detached, the closed loop is configured as indicated by the dotted line in the drawing, thereby turning on the light-emitting loads of the load 1 and the load 3.

Next, when the lighted connector is again connected, the light-emitting load should be turned off, and when it is not turned off even if it is again connected, it may be determined that the terminal of the corresponding connector is defective.

Next, when an interlock fault code has occurred but it is confirmed that there is no light-emitting load turned on, it is suspected that the interlock circuit is disconnected.

Therefore, the disconnection position is confirmed by sequentially turning on the first switch 12, the second switch 22, the third switch 32, and the fourth switch 42.

That is, as illustrated in FIG. 9, when the first switch 12 is turned off, a disconnection is confirmed by performing the electrical-conduction test for the A circuit, and when there is no disconnection, it may be determined that there is the power supply failure at the control unit side.

Then, when the first switch 12 is turned on and the second switch 22 is turned off, a disconnection is confirmed by performing the electrical-conduction test for the B circuit.

Next, when the second switch 22 is turned on and the third switch 32 is turned off, a disconnection is confirmed by performing the electrical-conduction test for the C circuit.

Then, when the third switch 32 is turned on and the fourth switch 42 is turned off, a disconnection is confirmed by performing the electrical-conduction test for the D circuit.

Next, when the fourth switch 42 is turned on, a disconnection is confirmed by performing the electrical-conduction test for the E circuit, and when there is no disconnection, it may be determined that there is the ground supply failure at the control unit side.

As described above, the present disclosure may easily check whether the plurality of connectors are detached or disconnected by only a single control unit by a relatively simple system.

As described above, while the present disclosure has been described with reference to the drawings, it is not limited thereto, and it is to be understood by those skilled in the art that various modifications and deformations may be made without departing from the spirit and the scope of the present disclosure.

What is claimed is:

1. A connecting system for charging an electric vehicle, comprising:
   a connector comprising a male connector connected to a battery side for supplying electric energy to a vehicle and a female connector connected to the male connector;
   an interlock circuit for constituting a closed circuit by connecting an interlock terminal of the male connector and an interlock terminal of the female connector to each other;
   a control unit having a built-in battery, and for measuring a voltage at each end of the interlock circuit;
   a light-emitting load provided on the interlock circuit inside the male connector; and
   a ground switch provided on the interlock circuit inside the male connector, wherein the ground switch is configured in parallel with the light-emitting load.

2. The connecting system for charging the electric vehicle of claim 1,
   wherein the connector is configured with a plurality of connectors, and
   wherein the interlock circuit has a plurality of interlock terminals of the plurality of connectors connected to each other to constitute a closed circuit.

3. The connecting system for charging the electric vehicle of claim 2,
   wherein the control unit connected to the interlock circuit is a single configuration.

4. The connecting system for charging the electric vehicle of claim 3,
   wherein the light-emitting load and the ground switch are configured inside the male connector of each of the plurality of connectors.

* * * * *